R. K. MINER.
PUMP.
APPLICATION FILED MAR. 6, 1912.

1,069,894.

Patented Aug. 12, 1913.

4 SHEETS—SHEET 1.

Witnesses:—

Inventor.
Ralph Kinney Miner,
By Wilhelm, Parker & Hard,
Attorneys.

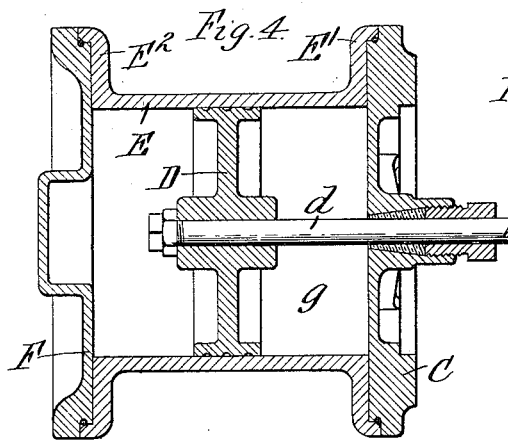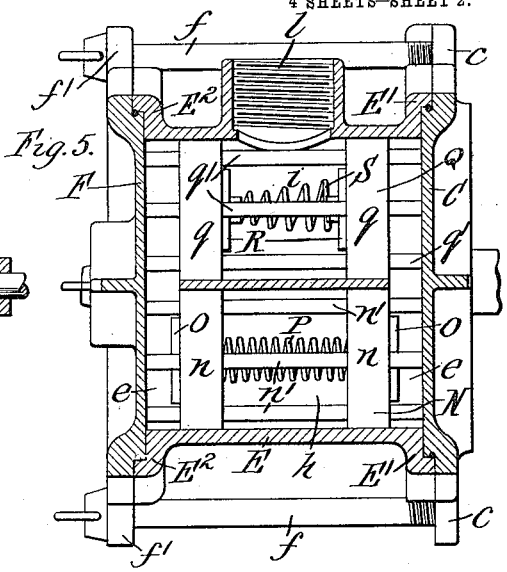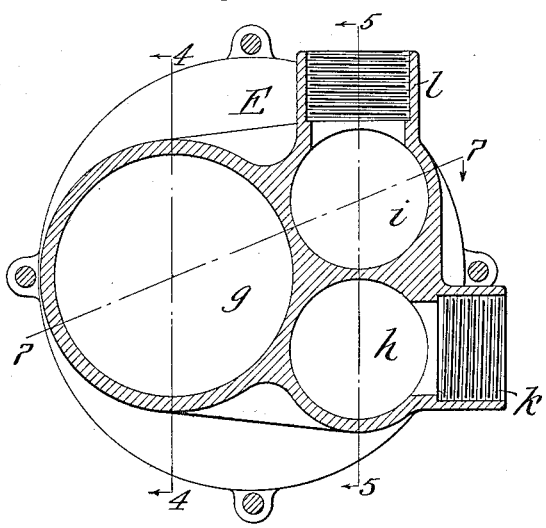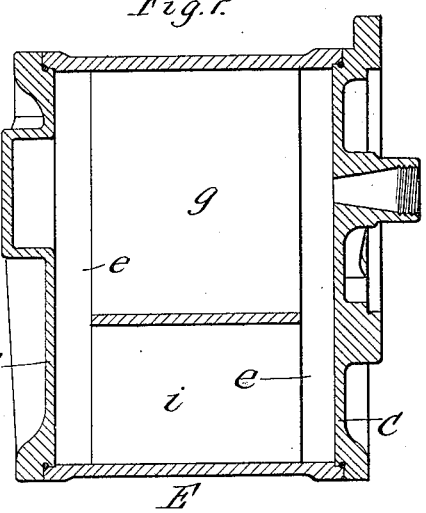

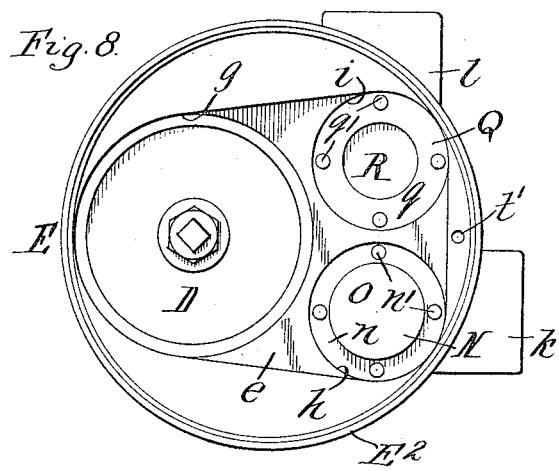
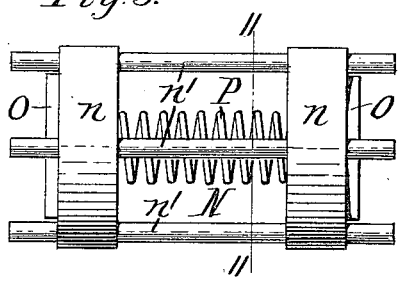
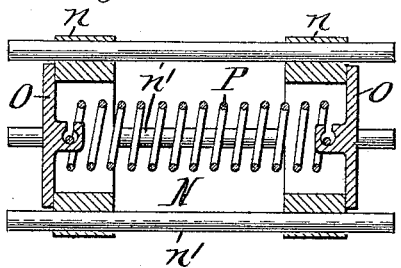
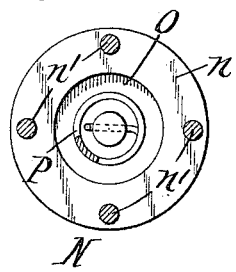
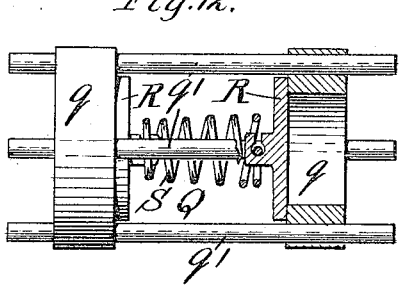

R. K. MINER.
PUMP.
APPLICATION FILED MAR. 6, 1912.

1,069,894.

Patented Aug. 12, 1913.
4 SHEETS—SHEET 4.

Witnesses:—
Alfred Birkenhagen
A. E. Dimond

Inventor
Ralph Kinney Miner,
By Wilhelm, Parker & Hand,
Attorneys.

UNITED STATES PATENT OFFICE.

RALPH KINNEY MINER, OF ORISKANY FALLS, NEW YORK, ASSIGNOR TO D. H. BURRELL & COMPANY, OF LITTLE FALLS, NEW YORK.

PUMP.

1,069,894. Specification of Letters Patent. Patented Aug. 12, 1913.

Application filed March 6, 1912. Serial No. 681,973.

*To all whom it may concern:*

Be it known that I, RALPH KINNEY MINER, a citizen of the United States, residing at Oriskany Falls, in the county of Oneida and State of New York, have invented a new and useful Improvement in Pumps, of which the following is a specification.

This invention relates to a double acting piston pump which is particularly desirable for use as a milk pump and in which the pump cylinder and its valves are so constructed that they can be readily arranged in different positions, as may be most convenient, and so that the parts can be readily taken apart for cleaning and reassembled for use, which is an important consideration in milk pumps in order to maintain the same in sanitary condition.

Figure 1:
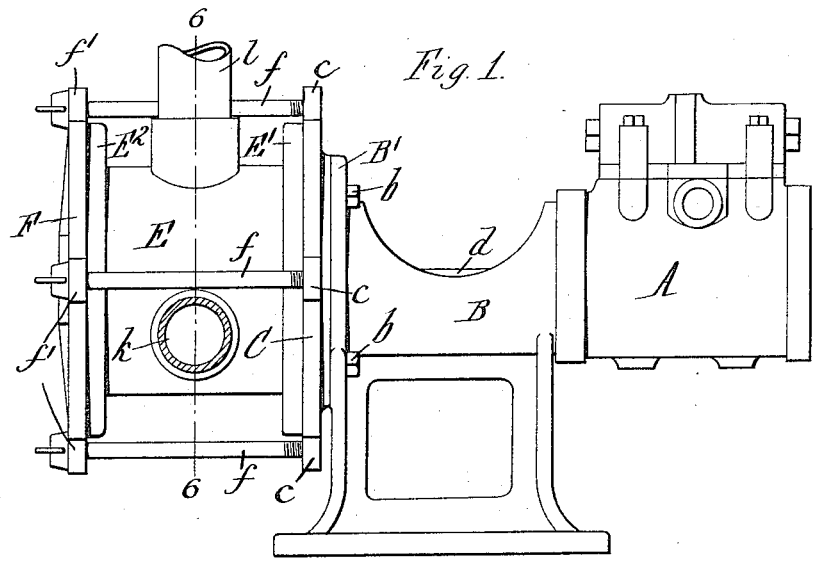
Figure 2:
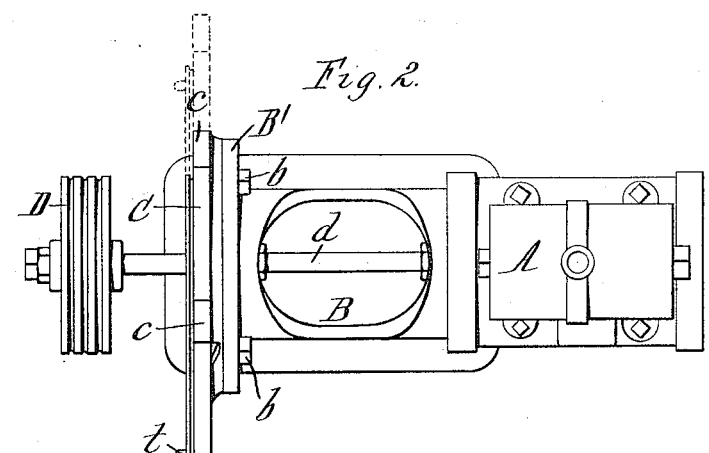
Figure 3:
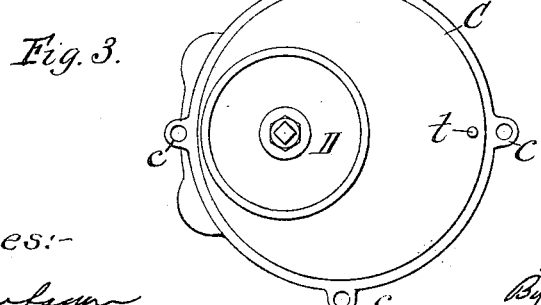
Figure 13:
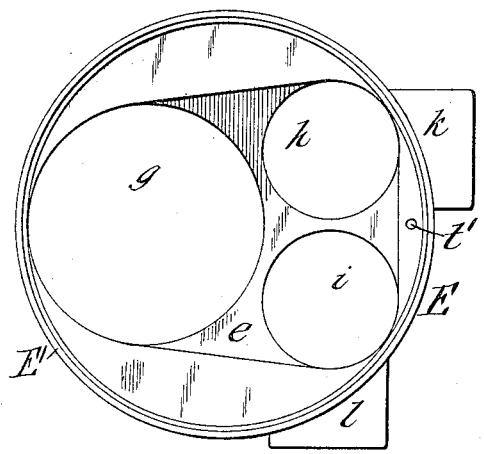
Figure 14:
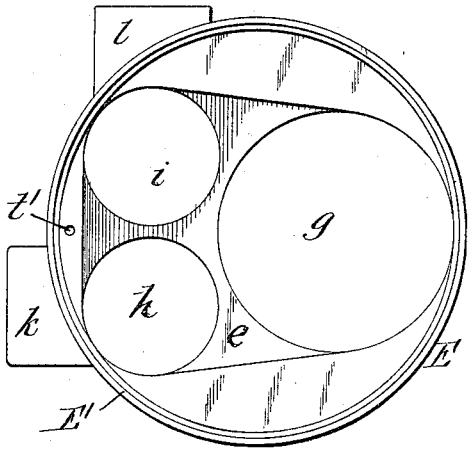
Figure 15:
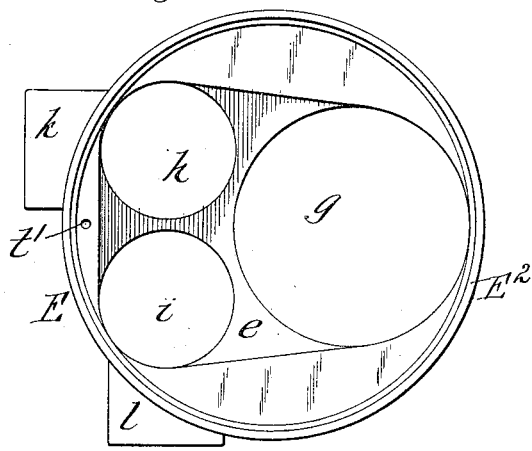
Figure 16:
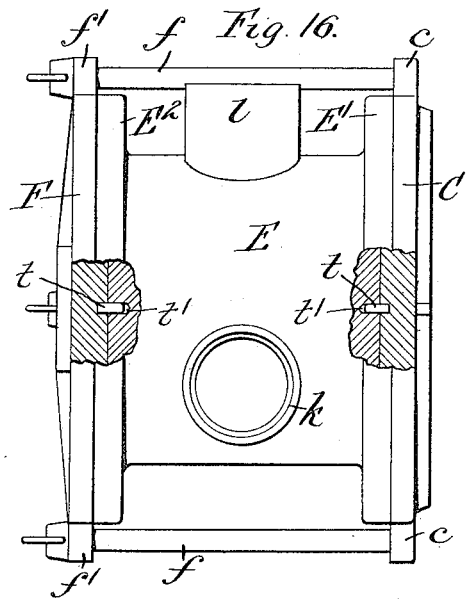

In the accompanying drawings: Figure 1 is a side elevation of this improved pump. Fig. 2 is a top plan view of the same with the pump cylinder omitted. Fig. 3 is an end elevation of the parts shown in Fig. 2. Fig. 4 is a longitudinal section through the pump cylinder on line 4—4, Fig. 6. Fig. 5 is a longitudinal section through the valve pockets on line 5—5, Fig. 6. Fig. 6 is a cross section on line 6—6, Fig. 1. Fig. 7 is a longitudinal section on line 7—7, Fig. 6. Fig. 8 is an end elevation of the pump casing with the heads omitted. Fig. 9 is a side elevation, on an enlarged scale, of the suction valves and cage. Fig. 10 is a longitudinal section of the same. Fig. 11 is a cross section on line 11—11, Fig. 9. Fig. 12 is a longitudinal elevation, partly in section, of the discharge valves and cage. Figs. 13, 14 and 15 are end views of the pump casing in different positions. Fig. 16 is a side elevation, partly in section, of the pump casing and its heads.

Like reference characters refer to like parts in the several figures.

A represents the steam or power cylinder which may be of any ordinary or suitable construction.

B represents the frame which supports the steam cylinder and also the pump cylinder. This frame is provided at the end which is farthest from the steam cylinder with a circular head or supporting plate B' to which the inner head C of the pump cylinder is secured by bolts $b$. The plate B' is arranged concentrically with reference to the axis of the steam cylinder, its piston rod $d$ and the pump piston D, while the inner head C of the pump cylinder is arranged eccentrically with reference to the axis of the steam cylinder. The pump casing E and the outer head F are secured to the inner head C by longitudinal screw bolts $f$ which pass through ears $f'$ on the outer head F and are screwed into ears $c$ on the inner head C. Upon removing these bolts the casing E and the head F are detached from the inner head C and from each other.

The casing E is provided with three longitudinal cylindrical bores $g$, $h$ and $i$, of which the bore $g$ is arranged in line with the piston rod $d$ and forms the pump cylinder in which the piston D moves back and forth, while the two smaller bores $h$ and $i$ form cavities or pockets in which the pump valves are arranged. Each of the three bores extends lengthwise through the body portion of the casing which is provided at its ends with flanges E' E² for connection, respectively, with the inner and outer heads C and F. The ends of the body portion of the casing are separated from the heads C and F by recessed flow spaces $e$ which connect the ends of the valve pockets $h$ and $i$ with the ends of the pump cylinder. The pump casing is provided with two pipe connections $k$ and $l$ which are arranged at right angles to each other and which communicate respectively with the valve cavities or pockets $h$ and $i$ midway between the ends thereof. One of these pipes operates as the induction or suction pipe and the other as the eduction or discharge pipe and either pipe may be used for either purpose, depending upon the arrangement of the interchangeable suction and discharge valves in the pockets $h$ and $i$.

N represents a holder or cage in which the suction valves O are arranged and which comprises two annular heads $n$ and longitudinal spacing rods $n'$ to which these heads are secured. The external diameter of the heads $n$ is such that the cage will fit snugly in either of the bores $h$ and $i$ of the pump casing E, and the length of the spacing rods $n'$ is such that they will fit between the heads of the casing E and prevent longitudinal displacement of the valve cage. The heads $n$ of the cage are arranged at such a distance apart that the space between them will communicate with either of the pipes $k$ and

*l*. The suction valves O are arranged to close against the outer sides of the heads *n* and are held to their seats by a spring P which connects both valves and can be readily detached from the same when the cage has been drawn out of the pocket.

Q represents the cage for the eduction or discharge valves R, which cage is constructed like the cage N and composed of annular heads *q* and spacing rods *q'*. The eduction valves are seated against the inner sides of the heads *q* and pressed against the same by a spring S arranged between these valves.

The two valve cages are interchangeable and either of them may be arranged in either of the pockets *h* and *i* of the pump casing. This enables either pipe *k* or *l* to be used as the suction pipe and the other as the discharge pipe, as may be most convenient. Ordinarily the horizontal pipe *k* connecting with the pocket *h* would be used as the suction pipe and the vertical pipe *l* as the discharge pipe.

Upon detaching the casing E and head F from the inner head C and from each other, and removing the valve cages from their pockets, all of the parts of the pump cylinder are separated and rendered accessible for thorough cleaning. The parts can be readily assembled again for use after having been cleaned, thus rendering it easy to keep all parts of the pump through which the milk flows or which come in contact with the milk in a clean and sanitary condition.

The pump casing and the heads are preferably so constructed that these parts can be arranged in different positions for use, as represented in Figs. 1, 2, 6, 8, 13, 14 and 15. In Figs. 1, 2, 6 and 8 the casing is so arranged that the valve pockets are arranged on the right hand side of the casing, when looking from the pump cylinder toward the steam cylinder, and the horizontal pipe connection *k* forms the inlet and the vertical connection *l* the discharge. In Fig. 13 the pump casing has been so turned between the heads C and F that the vertical pipe connection *l* points downward and forms the inlet and the horizontal connection *k* forms the discharge. In Fig. 14 the valve pockets are arranged on the left hand side of the casing, which position is produced by turning the inner head C one-half around on the piston rod, as indicated by dotted lines in Fig. 2, for which purpose the inner head C is detached from the supporting plate B' and after having been turned to the new position is again secured thereto, and then securing the casing and the outer head in the desired position to the inner head. The horizontal pipe connection *k* forms the inlet and the vertical connection *l* the discharge, as in Figs. 1, 2, 6 and 8. In the position shown in Fig. 15 the valve pockets are on the left hand side of the casing, as in Fig. 14, but the vertical connection *l* forms the inlet and the horizontal connection *k* the discharge.

In order to enable the heads C and F and the casing E to be accurately and quickly registered with reference to each other in these different positions, the heads are provided with dowel pins *t* and the casing at its ends with corresponding sockets *t'*.

The cylinder heads C and F and the flanges E' and E² of the casing E are preferably of circular outline, as shown. By arranging the valve chambers inside of the circular outline of these parts it is possible to form the engaging faces of the heads and casing by a simple turning operation and to pack the joints between these members with an ordinary circular packing. It is only necessary to pack one joint at each end of the casing to prevent leakage from the valve chambers as well as from the cylinder. Also by reason of the heads and casing being symmetrical it is possible to turn the casing end for end so as to position the outlets in different positions, for example as shown in Fig. 8, or as shown in Fig. 13.

I claim as my invention:

1. The combination with a pump casing open at both ends and provided with a plurality of bores extending lengthwise through the body of the casing, one bore forming the pump cylinder and another bore forming a valve pocket, said casing having a circular seat at each end surrounding both of said bores, of a piston arranged in said pump cylinder, circular heads applied to the seats at the ends of said casing and extending over the bores therein, and a valve arranged in said pocket, substantially as set forth.

2. The combination with a pump casing open at both ends and provided with a plurality of bores extending lengthwise through the body of the casing, one bore forming the pump cylinder and two other bores forming valve pockets, said casing having circular seats at its ends surrounding all of said bores, of a piston arranged in said pump cylinder, circular heads applied to the seats at the ends of said casing and extending over the bores therein, and interchangeable suction and discharge valves arranged in said pockets, substantially as set forth.

3. The combination of a pump casing having a plurality of straight-sided bores extending lengthwise therethrough, one bore forming the pump cylinder and another bore forming a valve pocket, valve mechanism removably mounted in said pocket, and a head applied to each end of said casing, covering the bores therein and retaining said valve mechanism in said pocket, substantially as set forth.

4. The combination of a pump casing open at both ends and provided with a pump cylinder and a valve pocket extending lengthwise through the casing, a valve cage removably mounted in said pocket, an automatically acting valve mounted in and retained by said cage, and a head applied to each end of said casing, covering said pump cylinder and valve pocket, said valve cage being retained in said pocket by said heads, substantially as set forth.

5. The combination with a pump casing open at both ends and provided with a pump cylinder and a valve pocket extending lengthwise through the casing, of heads extending over opposite ends of said casing, a valve cage arranged removably in said pocket and provided with spacing devices projecting into engagement with said heads, and valves arranged in said cage, substantially as set forth.

6. The combination with a pump casing open at both ends and having a valve pocket extending lengthwise through the casing, a pipe connection communicating with said pocket between the ends thereof, and heads applied to opposite ends of said casing, of a valve cage comprising longitudinal spacing bars and annular heads secured to said bars and forming valve seats on opposite sides of said pipe connection, and valves applied to said seats, substantially as set forth.

7. The combination with a pump casing open at both ends and having a bore for the pump piston and a valve pocket extending lengthwise through the casing, a pipe connection communicating with said pocket between the ends thereof, and a head applied to each end of said casing and covering said bore and pocket, of a valve cage removably arranged in said pocket and retained therein by said heads and provided with valve seats on opposite sides of said pipe connection, and valves applied to said seats and retained by said cage, substantially as set forth.

8. The combination with a pump casing open at both ends and having a bore for the pump piston and a valve pocket extending lengthwise through the casing, a pipe connection communicating with said pocket between the ends thereof, and a head applied to each end of said casing, covering said bore and pocket, of a valve cage removably arranged in said pocket and retained therein by said heads and provided with valve seats on opposite sides of said pipe connection, valves applied to said seats, and a spring connecting said valves, substantially as set forth.

9. The combination with a power cylinder, its piston rod, a pump piston secured to said rod, and a supporting frame, of a circular head, means for securing said head to said frame in different positions eccentric to said piston rod, a pump casing secured at one end to said head and provided with a pump cylinder and valve pockets extending lengthwise through said casing and with pipe connections communicating with said pockets and arranged at angles to each other, and a head applied to the opposite end of said casing, substantially as set forth.

10. The combination with a power cylinder, its piston rod, a pump piston secured to said rod, and a supporting frame, of a symmetrical head secured to said frame, a pump casing provided with a pump cylinder and valve pockets extending lengthwise through the casing and having seats at each end thereof adapted to fit said head interchangeably, a similarly shaped head adapted to be secured upon the seat at the outer end of said casing, said heads covering the ends of the pump cylinder and valve pockets, and interchangeable suction and discharge valves removably mounted in said pockets, substantially as set forth.

11. The combination of a pump casing provided with a pump cylinder and valve pockets extending lengthwise through said casing, and with pipe connections communicating with said pockets and arranged at right angles to each other, heads applied to opposite ends of said casing, said casing being capable of being shifted to make either pipe connection the inlet or discharge, and interchangeable suction and discharge valves, substantially as set forth.

Witness my hand in the presence of two subscribing witnesses.

RALPH KINNEY MINER.

Witnesses:
HARVEY FELDMEIER,
GEO. W. BELLINGER.

---

Copies of this patent may be obtained for five cents each, by addressing the "Commissioner of Patents, Washington, D. C."